US009213151B2

(12) United States Patent
Lin

(10) Patent No.: US 9,213,151 B2
(45) Date of Patent: Dec. 15, 2015

(54) TRACKING JUMPER CABLE ASSEMBLY

(71) Applicant: Jyh Eng Technology Co., Ltd., New Taipei (TW)

(72) Inventor: Yen-Lin Lin, New Taipei (TW)

(73) Assignee: JYH ENG TECHNOLOGY CO., LTD., New Taipei (TW)

( * ) Notice: Subject to any disclaimer, the term of this patent is extended or adjusted under 35 U.S.C. 154(b) by 109 days.

(21) Appl. No.: 14/224,772

(22) Filed: Mar. 25, 2014

(65) Prior Publication Data

US 2015/0205056 A1 Jul. 23, 2015

(30) Foreign Application Priority Data

Jan. 20, 2014 (TW) ............................ 103201118 U

(51) Int. Cl.
*G02B 6/44* (2006.01)
*G02B 6/38* (2006.01)

(52) U.S. Cl.
CPC ............ *G02B 6/3895* (2013.01); *G02B 6/3879* (2013.01); *G02B 6/447* (2013.01); *G02B 6/4416* (2013.01)

(58) Field of Classification Search
None
See application file for complete search history.

(56) References Cited

U.S. PATENT DOCUMENTS 5,305,405 A * 4/1994 Emmons .............. G02B 6/2817 385/100
5,666,453 A 9/1997 Dannenmann
6,456,768 B1 * 9/2002 Boncek ................ G02B 6/3817 385/100
6,532,328 B1 * 3/2003 Kline ...................... H01B 7/36 385/101
6,577,243 B1 * 6/2003 Dannenmann ....... H01R 13/641 324/66
7,038,135 B1 * 5/2006 Chan ................... H01R 13/641 174/84 R
7,049,937 B1 * 5/2006 Zweig .................. H01R 13/641 324/66
7,221,284 B2 * 5/2007 Scherer ................ G01R 31/045 340/286.02
7,544,909 B2 * 6/2009 Dhir ................... H01R 13/7175 200/51.11
8,267,706 B2 * 9/2012 Patel .................... H01R 13/516 439/188
2006/0046580 A1 * 3/2006 Ankerstjerne ....... H01R 13/465 439/713
2011/0043333 A1 * 2/2011 German ................. H04Q 1/136 340/10.1
2014/0369066 A1 * 12/2014 Jiang .................... G02B 6/4416 362/555

FOREIGN PATENT DOCUMENTS

CN 1095484 A 11/1994
TW M413200 10/2011

OTHER PUBLICATIONS

Product Bulletin PB382, "Belden Traceable Bonded-Pair Patch Cords", obtained at http://www.belden.com/docs/upload/PB382__Traceable-Bonded-Pair-Patch-Cords__FNL.pdf , two pages, copyright 2013, month unknown.*
PRWeb, "Mertek Industries Announces Optical Fiber Version of Innovative Self-Tracing Patch Cord", obtained at http://www.prweb.com/pdfdownload/8509720.pdf , dateline May 31, 2011.*

* cited by examiner

*Primary Examiner* — Mike Stahl
(74) *Attorney, Agent, or Firm* — Guice Patents PLLC

(57) ABSTRACT

A tracking jumper cable assembly includes an electrical connection device at each of two opposite ends of a duplex fiber optic patch cable thereof. The electrical connection device includes bottom cover member, a light transmissive top cover member covering the bottom cover member and defining an inside chamber therebetween, a circuit board mounted in the inside chamber and carrying a LED, two metal conducting plates electrically connected to the LED at the circuit board and respectively extended out of two back holes of the top cover member back hole to facilitate tracking remote connective portions of the cable with a pair of electronic component testing tweezers.

10 Claims, 5 Drawing Sheets

15 10 31 30 40 53 43 18 16 17 51 52 50 20 11 12

15
53
54
51
23
50
22
18
52
21
17
42
44
32
41
40
11
11
11
31
30

TRACKING JUMPER CABLE ASSEMBLY

BACKGROUND OF THE INVENTION

1. Field of the Invention

The present invention relates jumper cable technology and more particular, to a tracking jumper cable assembly, which facilitates tracking remote connective portions of the cable with a pair of electronic component testing tweezers, eliminating drawbacks and problems caused by conventional tracking methods.

2. Description of the Related Art

In network communication, a network jumper cable can be used to connect a personal computer to a wall network socket, and can also be used in a computer room for building up a network or a building for the cabling of a network in every room of the building. Open wiring is normally adopted for the arrangement of a network jumper cable to connect a personal computer to a wall network socket. In a room, the number of wall network sockets is limited and normally not more than six. If a network problem occurs, such as network disconnection, tracking remote connective portions of the cable will not be difficult.

However, in a network machine room or building network cabling, a large amount of jumper cables will be used for the connection between component parts. These jumper cables may extend over one another or arranged in bundles. Tracking remote connective portions of these jumper cables is complicated.

U.S. Pat. No. 5,666,453, equivalent to Taiwan M413200 and China CN1095484A, discloses a fiber optic plug tracking system, entitled "Fiber optic jumper cables and tracing method using same". A fiber optic jumper cable of this design includes a composite cable with a glass fiber light guide for single or multi transmission mode, standard fiber optic connectors, electrically powered light emitting devices at the fiber optic connectors, and a pair of electrical conductors embedded in the cable, with one or more electrical power connectors for selectively applying an external electrical power source to the light emitting devices (LEDs).

According to the aforesaid prior art design, a plug-in battery pack is used for powering and selectively activating the telltale LEDs. However, when plugging the pins of the plug-in battery pack to the fiber optic plugs of the fiber optic jumper cable for tracking remote connective portions of the cable, the pins of the plug-in battery pack may be curved or broken accidentally.

SUMMARY OF THE INVENTION

The present invention has been accomplished under the circumstances in view. It is one object of the present invention to provide a jumper cable assembly, which facilitates tracking remote connective portions of the cable with a pair of electronic component testing tweezers, eliminating drawbacks and problems of the prior design that uses a plug-in battery pack for tracking.

To achieve this and other objects of the present invention, a tracking jumper cable assembly of the invention comprises a jumper cable having an electrical connection device at each of two opposite ends thereof. Each electrical connection device comprises at least one fiber optic plug connectable to a mating fiber optic receptacle, a bottom cover member, a top cover member covering the bottom cover member and defining with the bottom cover member an inside chamber and providing two back holes in communication between the inside chamber and the atmosphere, light-emitting means mounted in the inside chamber and adapted for emitting light toward the outside of the top cover member, and two metal conductors electrically connected with the light-emitting means and respectively extended out of the back holes of the top cover member.

Further, each fiber optic plug comprises a spring clip located at a top side thereof. Further, the top cover member comprises a front top cover component and a light transmissive rear top cover component. Further, the front top cover component comprises a pressable protective guard supported on a rear end of the spring clip of each fiber optic plug. Further, the back holes of the top cover are located in the rear top cover component.

Preferably, the front top cover component comprises two hook rods respectively downwardly extended from two opposite lateral sides thereof; the bottom cover member comprises two locating grooves respectively disposed at two opposite lateral sides thereof and respectively forced into engagement with the hook rods of the front top cover component, two hook holes respectively disposed near two locating grooves, and two hook slots respectively disposed at a rear side relative to the hook holes; the rear top cover component comprises two front hooks bilaterally disposed near a front side thereof and respectively hooked in respective hook holes of the bottom cover member, and two bottom hooks bilaterally disposed at a bottom side thereof and respectively hooked in the hook slots of the bottom cover member.

Preferably, the light-emitting means is a light-emitting diode.

Preferably, each electrical connection device further comprises a circuit board carrying the light-emitting means and the conductor means in said inside chamber.

Preferably, the bottom cover member further comprises two inner retaining grooves bilaterally disposed at an inner side thereof for the positioning of the circuit board, and two rear mounting grooves located in a rear side thereof for the positioning of the two metal conductors.

Preferably, the metal conductors are respectively made in the form of a metal conducting plate.

Preferably, the metal conducting plates of the metal conductors each comprise a front plug rod located at a front side thereof; the circuit board comprises two plug holes adapted for receiving the front plug rods of the metal conducting plates of the metal conductors.

Further, the jumper cable can be a fiber optic patch cable or 4 twisted-pair network jumper cable.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
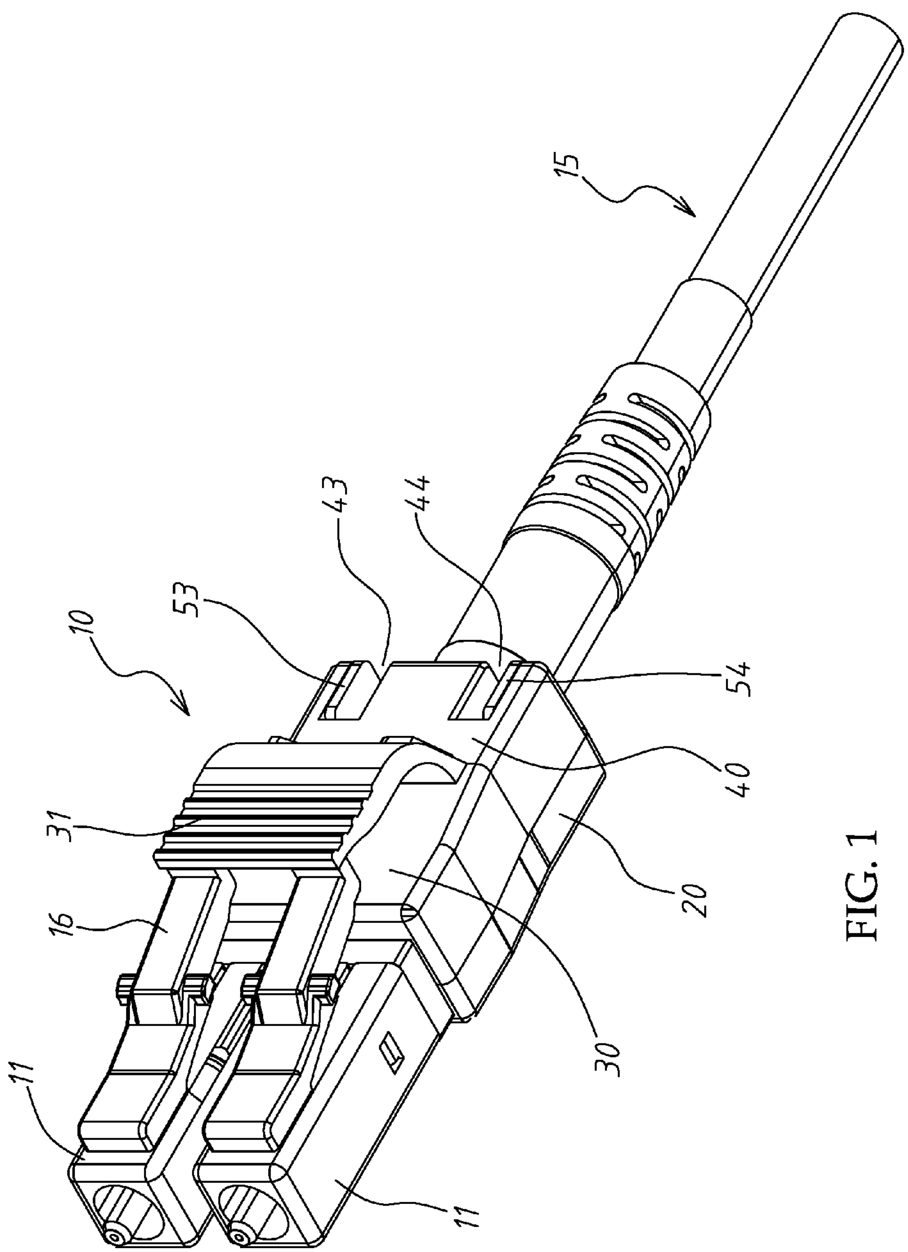
FIG. 1 is an elevational view of a tracking jumper cable assembly in accordance with the present invention.
Figure 2:
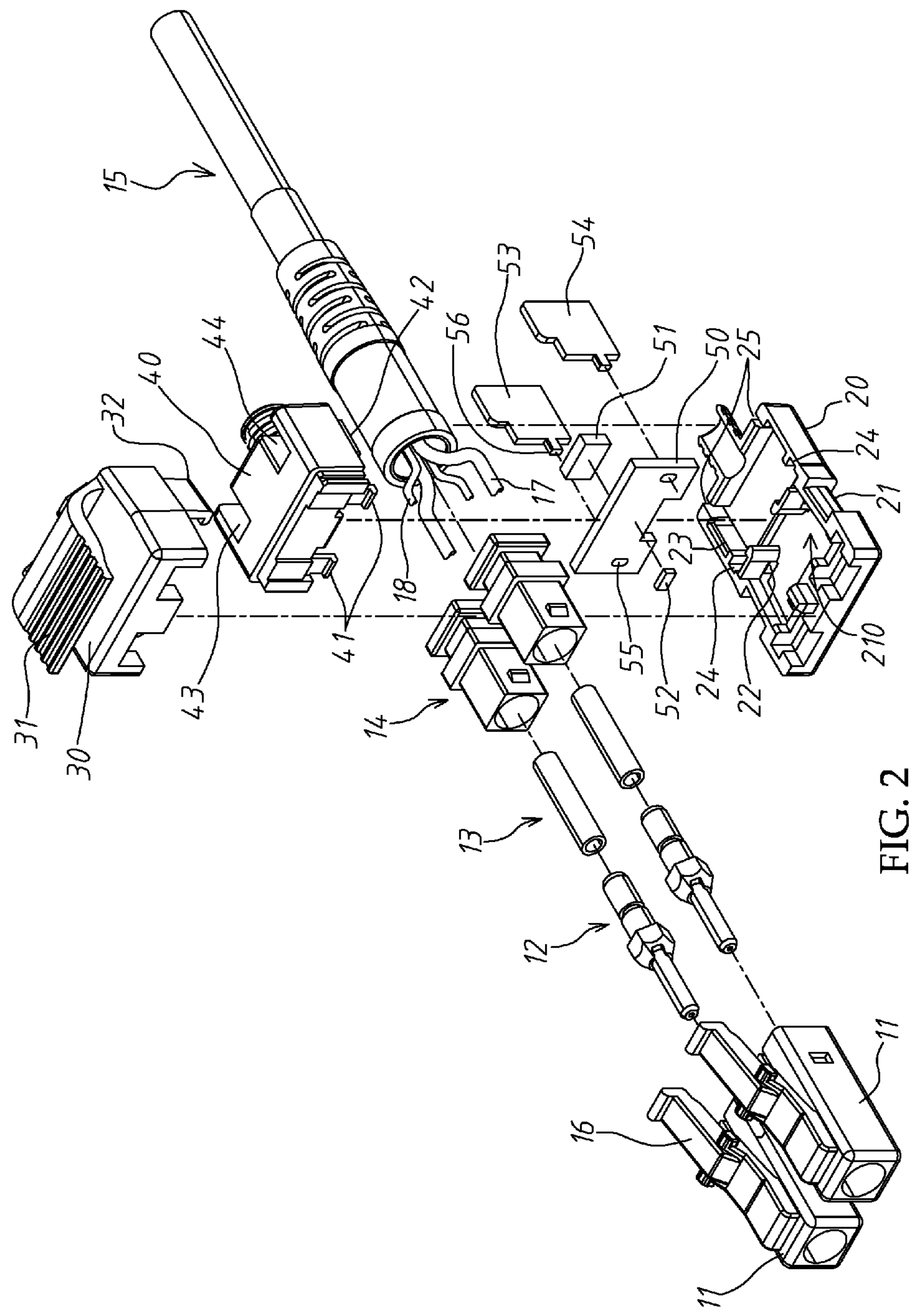
FIG. 2 is an exploded view of the tracking jumper cable assembly in accordance with the present invention.
Figure 3:
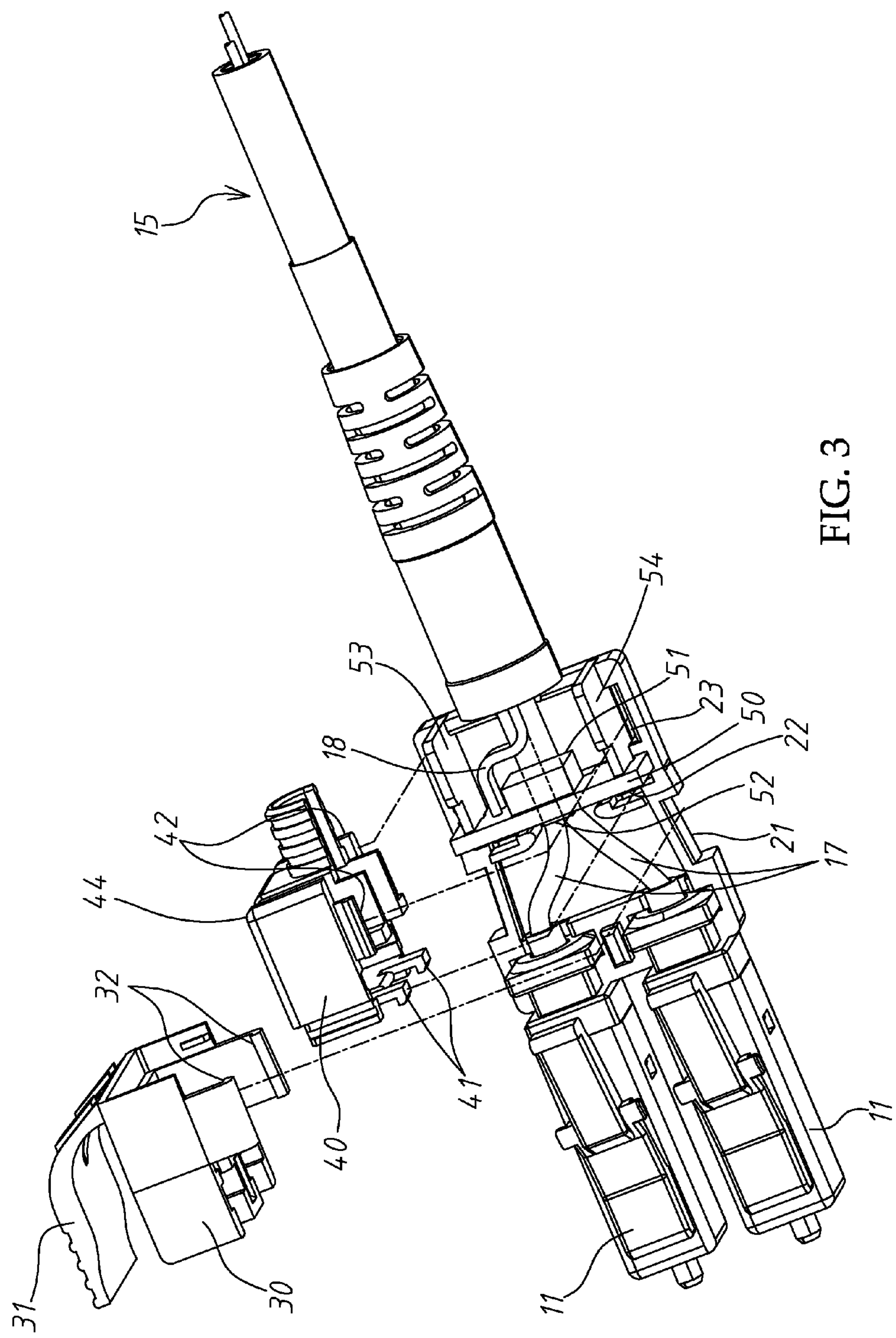
FIG. 3 is a schematic drawing illustrating the tracking jumper cable assembly partially assembled in accordance with the present invention.

Referring to FIGS. 1-3, a tracking jumper cable assembly in accordance with the present invention is shown in the form of, for example, duplex fiber optic patch cable, having an electrical connection device 10 located at each of two distal ends thereof (only one electrical connection device 10 is shown in the drawings). Each electrical connection device 10 comprises two fiber optic plugs 11 arranged at a front side thereof for connection to a respective slot in a fiber optic receptacle (not shown). Further, the invention can also be made in the form of a 4 twisted-pair network jumper cable.

The electrical connection device 10 further comprises a bottom cover member 20, and a top cover member formed of a front top cover component 30 and a rear top cover component 40. In this embodiment, the fiber optic plugs 11 are LC fiber optic plugs, each having mounted therein in proper order a plug pin 12, a sleeve 13 and a holder block 14. When the bottom cover member 20 is assembled with the front top cover component 30 and rear top cover component 40 of the top cover member, a fiber optic cable 15 comprising optical fibers and lead wires are mounted in the positioned in the chamber defined in the bottom cover member 20 and the top cover member. Further, the plug pins 12, sleeves 13 and holder blocks 14 of the LC fiber optic plugs 11 are positioned in an inside chamber 210 defined in the bottom cover member 20. The front top cover component 30 has a pressable protective guard 31 suspending at a top side thereof over respective rear ends of spring clips 16 of the LC fiber optic plugs 11. Pressing the pressable protective guard 31 gives a downward pressure to the rear ends of the spring clips 16, allowing the fiber optic plugs 11 to be separated from the fiber optic receptacle.

The front top cover component 30 has two hook rods 32 respectively downwardly extended from two opposite lateral sides thereof. The bottom cover member 20 comprises two locating grooves 21 respectively disposed at two opposite lateral sides thereof for receiving the hook rods 32 of the front top cover component 30 to secure the bottom cover member 20 and the front top cover component 30 together. The rear top cover component 40 has two front hooks 41 bilaterally disposed near a bottom side thereof and respectively hooked in respective hook holes 22 in the bottom cover member 20, and two bottom hooks 42 bilaterally disposed at the bottom side and respectively hooked in respective hook slots 23 in the bottom cover member 20. Further, the rear top cover component 40 is light transmissive, having two back holes 43 and 44 disposed in communication between the inside chamber 210 and the atmosphere.

As illustrated, the electrical connection device 10 further comprises a circuit board 50 mounted in within the bottom cover member 20, the front top cover component 30 and the rear top cover component 40, a light-emitting diode (LED) 51 adapted for emitting light, two metal conducting plates 53 and 54 electrically connected to the power circuit (not shown) of the circuit board 50 and respectively extended out of the two back holes 43 and 44 of the rear top cover component 40 for connection to external circuit means, and an unidirectional current element, for example, diode 52, electrically connected between the LED 51 and the positive and negative metal conducting plates 53 and 54 for guiding positive and negative currents to the LED 51.

Figure 4:
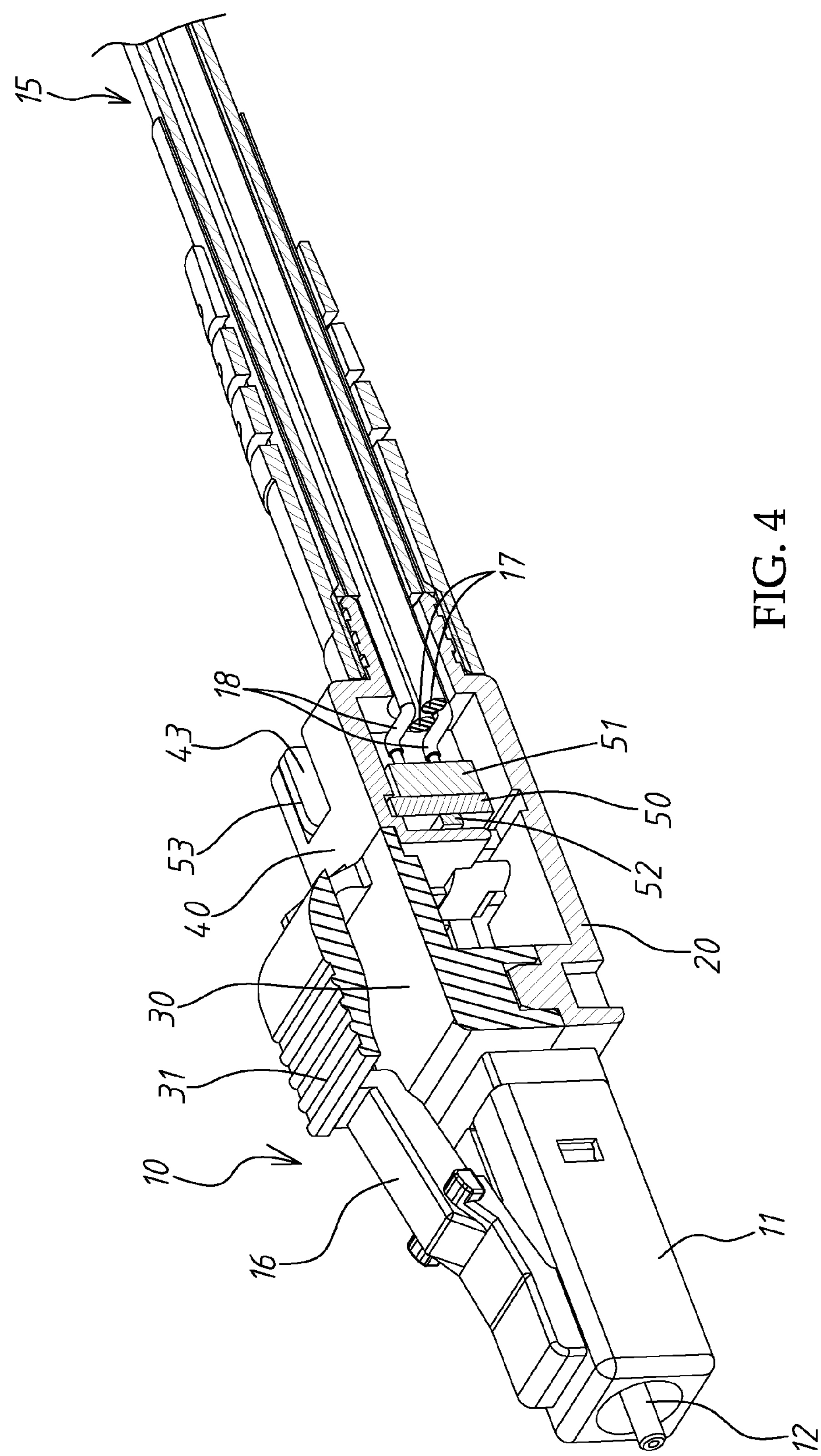
FIG. 4 is a sectional elevational view of the tracking jumper cable assembly shown in FIG. 1.

Further, the bottom cover member 20 further comprises two inner retaining grooves 24 bilaterally disposed at two opposite lateral sides and facing toward each other for the mounting of the circuit board 50, and two rear mounting grooves 25 bilaterally disposed at a rear side thereof. The circuit board 50 comprises two plug holes 55 corresponding to the rear mounting grooves 25 of the bottom cover member 20 and adapted for receiving respective front plug rods 56 of the positive and negative metal conducting plates 53 and 54. After plugged the front plug rods 56 of the positive and negative metal conducting plates 53 and 54 into the plug holes 55 of the circuit board 50, the respective rear ends of the positive and negative metal conducting plates 53 and 54 are respectively positioned in the rear mounting grooves 25 of the bottom cover member 20. As illustrated in FIGS. 3 and 4, the fiber optic cable 15 comprises at least one, for example, two optical fibers 17 respectively connected to the fiber optic plugs 11, and at least one, for example, two lead wires 18 connected to the diode 52 at the circuit board 50.

Figure 5:
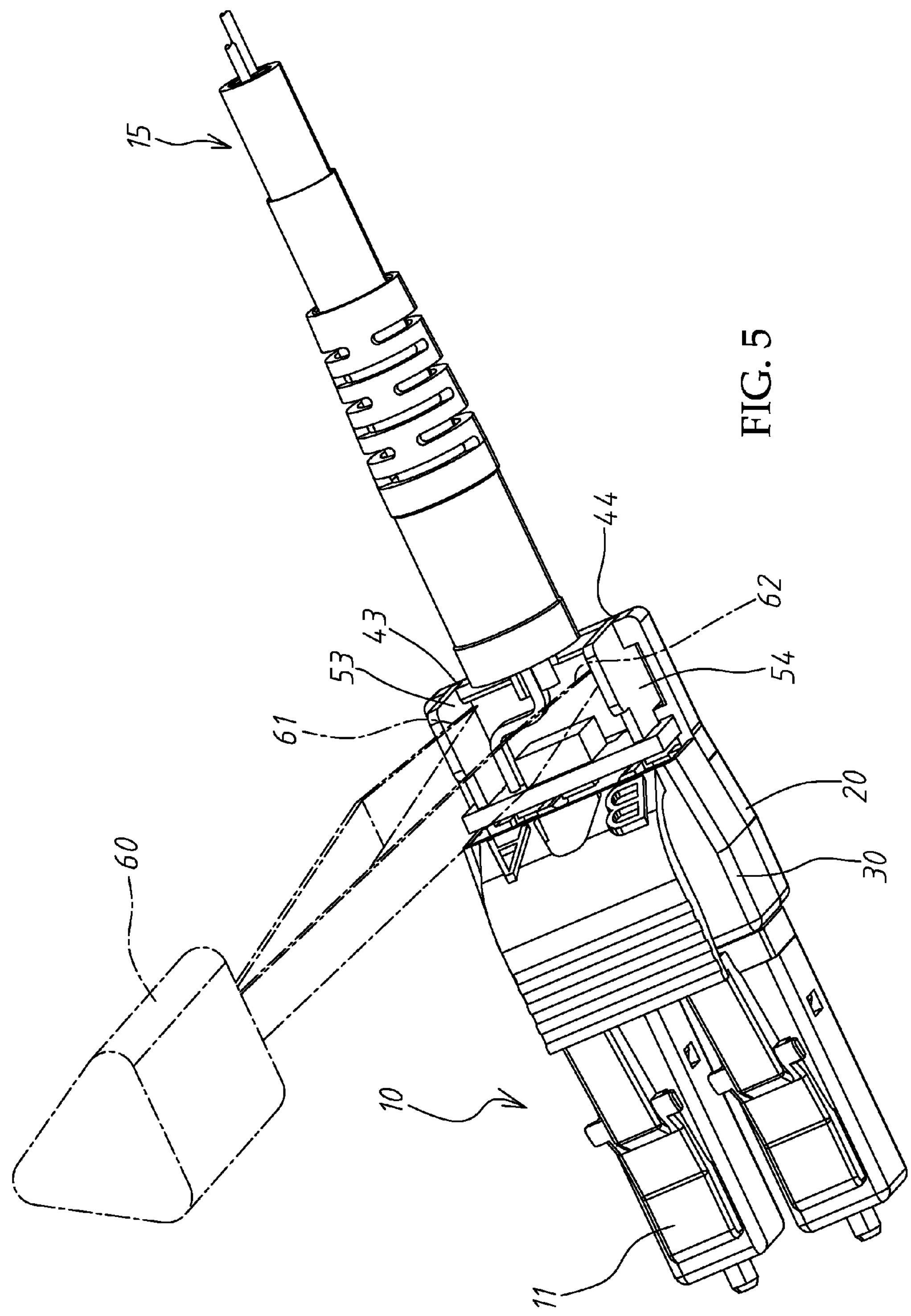
FIG. 5 is a schematic drawing illustrating a tracking inspection operation of the present invention.

Referring to FIG. 5, when tracking remote connective portions of the cable, forwardly or downwardly insert the left and right tips 61 and 62 of a pair of electronic component testing tweezers 60 into the two back holes 43 and 44 of the rear top cover component 40 to move the left and right tips 61 and 62 of the electronic component testing tweezers 60 into contact with the positive and negative metal conducting plates 53 and 54, thereby conducting the diode 52 and the LED 51, and thus, the LEDs at the two opposite ends of the tracking duplex fiber optic patch cable will give off light at the same time, facilitating rapidly tracking remote connective portions of the cable.

The use of the tracking jumper cable assembly facilitates tracking remote connective portions of the cable with a pair of electronic component testing tweezers without inserting the probes of a power supply device into the plug holes of the fiber optic plugs to track the cable. Thus, the invention eliminates the drawbacks of conventional tracking jumper cables that make replacement difficult, tedious and time consuming, and can lead to errors.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A tracking jumper cable assembly, comprising a jumper cable having an electrical connection device at each of two opposite ends thereof, each said electrical connection device comprising:

- at least one fiber optic plug connectable to a mating fiber optic receptacle;
- a bottom cover member;
- a top cover member covering said bottom cover member and defining with said bottom cover member an inside chamber, said top cover member comprising at least two back holes in communication between said inside chamber and the atmosphere;
- light-emitting means mounted in said inside chamber and adapted for emitting light toward the outside of said top cover member; and
- two metal conductors electrically connected with said light-emitting means and respectively extended out of said back holes of said top cover member.

2. The tracking jumper cable assembly as claimed in claim 1, wherein each said fiber optic plug comprises a spring clip located at a top side thereof; said top cover member comprises a front top cover component and a light transmissive rear top cover component, said front top cover component comprising a pressable protective guard supported on a rear end of the spring clip of each said fiber optic plug; said back holes of said top cover are located in said rear top cover component.

3. The tracking jumper cable assembly as claimed in claim 2, said front top cover component comprises two hook rods respectively downwardly extended from two opposite lateral sides thereof; said bottom cover member comprises two locating grooves respectively disposed at two opposite lateral sides thereof and respectively forced into engagement with said hook rods of said front top cover component, two hook holes respectively disposed near two locating grooves, and two hook slots respectively disposed at a rear side relative to said hook holes; said rear top cover component comprises two front hooks bilaterally disposed near a front side thereof and respectively hooked in said hook holes of said bottom cover member, and two bottom hooks bilaterally disposed at a bottom side thereof and respectively hooked in said hook slots of said bottom cover member.

4. The tracking jumper cable assembly as claimed in claim 1, wherein said light-emitting means is a light-emitting diode.

5. The tracking jumper cable assembly as claimed in claim 1, wherein each said electrical connection device further comprises a circuit board carrying said light-emitting means and said metal conductors in said inside chamber.

6. The tracking jumper cable assembly as claimed in claim 5, wherein said bottom cover member further comprises two inner retaining grooves bilaterally disposed at an inner side thereof for the positioning of said circuit board, and two rear mounting grooves located in a rear side thereof for the positioning of said two metal conductors.

7. The tracking jumper cable assembly as claimed in claim 1, wherein said metal conductors are respectively made in the form of a metal conducting plate.

8. The tracking jumper cable assembly as claimed in claim 7, wherein said metal conducting plates of said metal conductors each comprise a front plug rod located at a front side thereof; said circuit board comprises two plug holes adapted for receiving the front plug rods of said metal conducting plates of said metal conductors.

9. The tracking jumper cable assembly as claimed in claim 1, wherein said jumper cable is a fiber optic patch cable.

10. The tracking jumper cable assembly as claimed in claim 1, wherein said jumper cable is a 4 twisted-pair network jumper cable.

* * * * *